United States Patent [19]

Hsieh

[11] Patent Number: 5,030,598
[45] Date of Patent: Jul. 9, 1991

[54] SILICON ALUMINUM OXYNITRIDE MATERIAL CONTAINING BORON NITRIDE

[75] Inventor: Martin Y. Hsieh, Palo Alto, Calif.

[73] Assignee: GTE Products Corporation, Stamford, Conn.

[21] Appl. No.: 542,339

[22] Filed: Jun. 22, 1990

[51] Int. Cl.⁵ .............................................. C04B 35/50
[52] U.S. Cl. ........................................ 501/98; 501/97
[58] Field of Search ............................. 501/96, 97, 98

[56] References Cited

U.S. PATENT DOCUMENTS

| 4,519,966 | 5/1985 | Aldinger et al. | 264/56 |
| 4,547,470 | 10/1985 | Tanase et al. | 501/87 |
| 4,873,210 | 10/1989 | Hsieh | 501/98 |
| 4,935,389 | 6/1990 | Umebayashi et al. | 501/97 X |

Primary Examiner—William R. Dixon, Jr.
Assistant Examiner—Lisa M. Schull
Attorney, Agent, or Firm—James Theodosopoulos

[57] ABSTRACT

A small amount of boron nitride is added to a mixture of silicon nitride, aluminum nitride and yttrium oxide, prior to sintering, to increase modulus of rupture and/or elastic modulus of the sintered material.

3 Claims, No Drawings

SILICON ALUMINUM OXYNITRIDE MATERIAL CONTAINING BORON NITRIDE

This invention concerns silicon aluminum oxynitride materials, commonly referred to as sialons. Examples thereof are shown in U.S. Pat. No. 4,873,210 and patents cited therein.

The patent discloses that a mixture of silicon nitride, yttrium oxide and aluminum nitride can be sintered to a material having high hardness and high density.

I have found that if a small amount of boron nitride is added to the mixture of silicon nitride, yttrium oxide and aluminum nitride, that the modulus of rupture and/or the elastic modulus of the sintered material can be increased. The amount of added boron nitride is between 0.01 and 2.0 weight percent.

The preferred composition of the mixture of silicon nitride, aluminum nitride and yttrium oxide is 6.2 to 6.4 wt. % yttrium oxide, 10 to 12.5 wt. % aluminum nitride, balance silicon nitride.

A mixture, Mixture A, was prepared consisting of 6.4 wt. % yttrium oxide, 10.4 wt. % aluminum nitride, 83.2 wt. % silicon nitride. After thorough mixing and milling, the mixture was pressed into a proper shape and was pressureless sintered in a silicon nitride crucible under one atmosphere nitrogen for four hours at 1780° C. The modulus of rupture of this material was 80,120 pounds per square inch. When 0.5 wt. % boron nitride was added to Mixture A, which was then processed identically, the modulus of rupture was increased to 92,310 pounds per square inch, a gain of 15.2%.

The addition of small amounts of boron nitride also improves the elastic modulus.

A mixture, Mixture B, was prepared consisting of 6.2 wt. % yttrium oxide, 12.5 wt. % aluminum nitride, 81.3 wt. % silicon nitride. After thorough mixing and milling, the mixture was pressed into a proper shape and was pressureless sintered in a silicon nitride crucible under one atmosphere nitrogen for four hours at 1780° C. The elastic modulus of this material was 46 million pounds per square inch. When 0.1 wt. % boron nitride was added to Mixture B, which was then processed identically, the elastic modulus was increased to 48.4 million pounds per square inch, a gain of 5.2%. For an addition of 0.5 wt. % boron nitride, the elastic modulus was 48.6 million pounds per square inch, a gain of 5.7%. For an addition of 1.0 wt. % boron nitride, the elastic modulus was 47.0 million pounds per square inch, a gain of 2.2%.

I claim:

1. A sintered material consisting of a mixture of 6.2 to 6.4 wt. % yttrium oxide, 10 to 12.5 wt. % aluminum nitride, balance silicon nitride, to which mixture has been added 0.01 to 2.0 wt. % boron nitride, the mixture, including the boron nitride, having been pressed into a shape and then sintered, the boron nitride being effective to increase the modulus of rupture and/or the elastic modulus of the material.

2. The sintered material of claim 1 wherein the mixture consists of 6.4 wt. % yttrium oxide, 10.4 wt. % aluminum nitride, balance silicon nitride and the amount of added boron nitride is 0.5 wt. %.

3. The sintered material of claim 1 wherein the mixture consists of 6.2 wt. % yttrium oxide, 12.5 wt. % aluminum nitride, balance silicon nitride and the amount of added boron nitride is 0.1 or 0.5 or 1.0 wt. %.

* * * * *